March 8, 1938. W. H. LEWIS 2,110,138
MANUFACTURE OF WROUGHT IRON
Filed Dec. 9, 1935
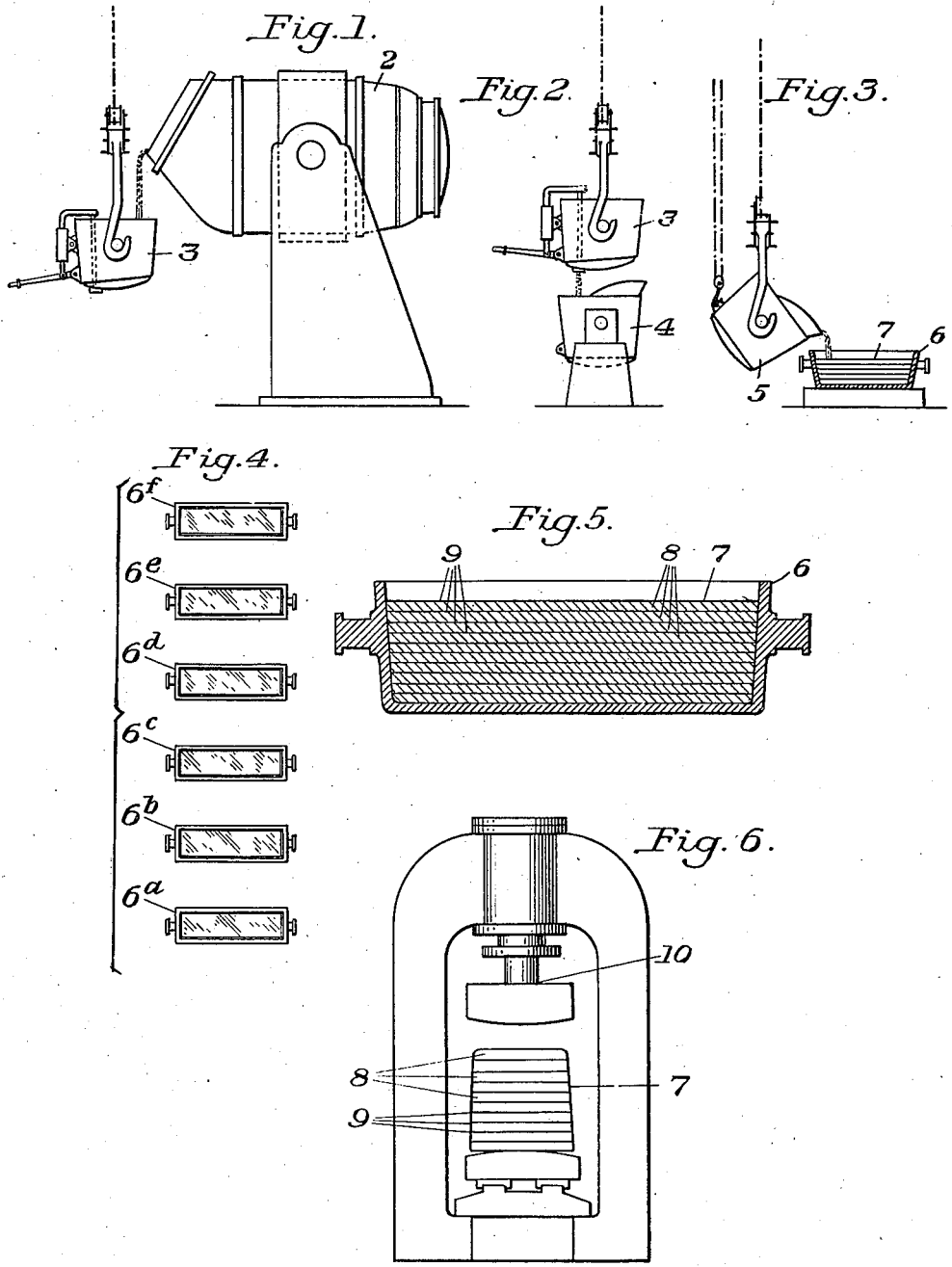
INVENTOR
William H. Lewis
by Stebbins, Blenko & Parmelee
His Attys.

Patented Mar. 8, 1938

2,110,138

UNITED STATES PATENT OFFICE 2,110,138

MANUFACTURE OF WROUGHT IRON

William H. Lewis, Pittsburgh, Pa.

Application December 9, 1935, Serial No. 53,463

8 Claims. (Cl. 75—47)

This invention relates generally to the manufacture of wrought iron and provides a method in which the slag is more uniformly distributed throughout the iron than is the case with present methods. The present invention also renders easier the squeezing out of the excess slag from the mass of wrought iron and slag.

In the accompanying drawing which illustrates one method of carrying out my invention, Figure 1 illustrates a Bessemer converter discharging a charge of partially blown iron into a ladle;

Figure 2 illustrates one manner of separating the slag from the iron;

Figure 3 illustrates the pouring of wrought iron in layers into a mold;

Figure 4 is a plan view of a series of molds which may be used in pouring the wrought iron in layers;

Figure 5 is a vertical longitudinal section through a mold containing an ingot of wrought iron poured in layers; and Figure 6 is a front elevation of a press and ingot which has been poured in layers, the press being adapted to squeeze out excess slag from the ingot.

In a specific embodiment of my invention, a heat of molten iron is charged into a Bessemer converter and the heat is partially blown to remove substantially all of the silicon and part of the carbon. The partially blown iron and the highly silicious slag formed during the partial blow are removed from the converter, the iron is separated from the slag, and the iron is charged into a Bessemer converter for final blowing. In Figure 1 the heat of molten iron which has been partially blown in the Bessemer converter 2 is being discharged into a ladle 3. As shown, the partially blown iron and slag are discharged from the top of the converter so that both the partially blown iron and the slag resulting therefrom are delivered to the ladle. In order to separate the slag formed in the partial blow from the iron, the iron is discharged from the bottom of the ladle 3 into a ladle 4, as illustrated in Figure 2. By this means the highly silicious slag formed in the partial blow is removed from the iron.

The iron is then charged into a Bessemer converter. Slag material such as slag per se, iron ore, or roll scale of the desired composition is charged into the iron in the converter and the charge of iron containing the added slag is given a further blow. The amount of slag material added may be varied within rather wide limits, depending upon the composition desired in the finished product. I may, for example, employ 60 to 75 pounds of roll scale per ton of iron. The slag material may be added either prior to or during the second or final blow, the essential feature being that the added slag be present during the second blow so that it will be agitated and intimately distributed throughout the charge of iron during the second blow. In the claims I have used the term "slag material" to mean either slag per se or material which will form slag during the second blowing operation. Thus, the ore or roll scale will be melted and form slag during the second blow, and the slag formed will be intimately distributed throughout the body of the iron during the second blowing operation. The heat produced from the combustion of the carbon and other elements remaining in the iron after the first blowing operation and the action of the blast passing through the iron are utilized to melt the slag additions made and mix the same with the iron.

After the second or final blow is completed, the heat is delivered to a ladle 5 and is poured into a series of molds 6 in such manner that the ingots 7 of wrought iron are formed in layers, as shown most clearly in Figure 5. The formation of the layers 8 is accomplished by using a plurality of molds, six such molds being shown in Figure 4, and being designated by the reference characters 6a, 6b, 6c, 6d, 6e and 6f. A thin layer of wrought iron is poured from the ladle 5 successively into each of the molds 6a—6f. Each of the layers of wrought iron is given a sufficient time to cool, so that a thin coating 9 of slag separates out on the layer before the next layer is poured. The layers are preferably given sufficient time so that they are cooled to an extent such that when another layer is poured on top, the first layer remains solid so as not to prevent the squeezing out of the excess slag in the subsequent pressing operation. In the embodiment shown in the drawing, each of the molds 6a—6f is approximately 72 in. long, 20 in. wide and 24 in. deep. Each of the layers 8 is approximately 2 in. thick. Several molds, in this instance six molds, are employed in order that each of the layers will have time to cool to a point where it remains solid when another layer is poured on top of it, without delaying the pouring of the layers into the various molds. In pouring a layer of the size and thickness described, it will ordinarily take about 20 seconds, so that the pouring of a layer in each of the six molds will ordinarily take about 120 seconds. Thus, the time between pouring any given layer in any given mold and the time when a layer is poured on top of it will be approximately 2 to 3 minutes when the time necessary to move the ladle is taken into consideration. This gives each layer a sufficient time so as to allow a small amount of slag to separate out on the surface of each layer and also provide sufficient time so that each layer remains solid when another layer is poured on top of it.

The ingots 7 formed of the layers 8 is then transferred to a press 10 and the excess slag is squeezed out of the ingot. Instead of using a press, I may pass the ingot between rolls or exert pressure thereon in any other suitable manner so as to eliminate the excess slag. The ingot from which the excess slag has been removed is then rolled in any usual or desired manner to produce blooms, billets or slabs which can be worked in the usual manner to form the desired wrought iron articles.

The addition of slag material to the charge of iron in the converter and the blowing of the charge in the presence of the slag material agitates the slag material and distributes it throughout the charge of iron. The pouring of the wrought iron containing slag particles distributed therethrough into a mold in layers and in such manner that the slag has an opportunity to separate in thin coatings between the layers of wrought iron, makes for further uniformity in the distribution of the slag throughout the iron. The pouring of the wrought iron in layers also makes it easier to remove the excess slag during the squeezing operation. This more uniform distribution of the slag in the iron makes possible the production of heavy forgings or rolled shapes having the same characteristics as much lighter material which has been produced by the hand puddling process followed by rolling or forging piles made of muck bars. The amount of slag in the wrought iron may be controlled in accordance with the amount of slag or slag material added to the converter prior to or during the final blow.

I have illustrated and described by way of example the present preferred method and apparatus for carrying out my invention. It will be understood, however, that the invention may be otherwise embodied or practiced within the scope of the following claims.

I claim:

1. In the manufacture of wrought iron, the steps comprising pouring molten iron having slag distributed through it in layers on top of each other, and allowing sufficient time to elapse between the pouring of each layer to cause a small amount of slag to separate out on the surface of each layer.

2. In the manufacture of wrought iron, the steps comprising pouring molten iron having slag distributed through it in layers on top of each other, and allowing sufficient time to elapse between the pouring of each layer so that a layer remains solid when another layer is poured on top of it.

3. In the manufacture of wrought iron, the steps comprising pouring in layers molten iron having slag distributed through it, solidifying the layers, and squeezing out the excess slag.

4. In the manufacture of wrought iron, the steps comprising pouring molten iron having slag distributed through it in layers on top of each other, allowing sufficient time to elapse between the pouring of each layer to cause a small amount of slag to separate out on the surface of each layer, and squeezing out the excess slag.

5. In the manufacture of wrought iron, the steps comprising adding slag material to a charge of iron and blowing the charge, pouring the charge in layers on top of each other while allowing sufficient time to elapse between the pouring of each layer to cause a small amount of slag to separate out on the surface of each layer, and squeezing out the excess slag.

6. In the manufacture of wrought iron, the steps comprising partially blowing a charge of iron, separating the slag from the iron, adding slag material to the iron and continuing the blow, pouring the iron in layers on top of each other while allowing sufficient time to elapse between the pouring of each layer to cause a small amount of slag to separate out on the surface of each layer, and squeezing out the excess slag.

7. In the manufacture of wrought iron, the steps comprising partially blowing a charge of iron to remove substantially all of the silicon and part of the carbon, separating the slag from the iron, adding slag material to the iron and continuing the blow, pouring the iron in layers on top of each other while allowing sufficient time to elapse between the pouring of each layer to cause a small amount of slag to separate out on the surface of each layer, and squeezing out the excess slag.

8. In the manufacture of wrought iron, the steps comprising blowing a charge of iron in a Bessemer converter, discharging the charge of iron and slag formed during the blow from the converter, removing the formed slag, charging the iron which has been blown into a Bessemer converter and continuing the blow, pouring the blown iron in layers on top of each other while allowing sufficient time to elapse between the pouring of each layer to cause a small amount of slag to separate out on the surface of each layer, and squeezing out the excess slag.

WILLIAM H. LEWIS.